UNITED STATES PATENT OFFICE.

CHARLES J. TINNERHOLM, OF BROOKLYN, NEW YORK, ASSIGNOR TO JOHN VOEKLER, JR., OF SAME PLACE.

COMPOUND FOR LIMING HIDES.

SPECIFICATION forming part of Letters Patent No. 236,860, dated January 18, 1881.

Application filed June 15, 1880. (No specimens.)

*To all whom it may concern:*

Be it known that I, CHARLES J. TINNERHOLM, of Brooklyn, in the county of Kings and State of New York, have invented a certain new and useful Improvement in Compounds for Liming Hides; and I do hereby declare that the following is a full, clear, and exact description of the invention, which will enable others skilled in the art to which it appertains to make and use the same.

My invention has relation to the manufacture of leather from hides by the usual processes of liming, bating, and tanning; and it consists in a new and useful chemical compound or composition for removing the hair from the hides or skins to be treated, substantially as hereinafter more fully set forth.

In describing this compound and its use, I have based it on an estimate of one hundred pounds of skins or hides to be treated.

One-eighth of a bushel of lime is dissolved in water and the lime solution poured into a vat containing a sufficiency of water to cover the hides. Next a suitable quantity of burnt oolite (or other limestone of a like nature—*i. e.*, pure calcareous spar) is treated with two ounces of muriatic acid, after which a proper quantity of water is added to form a strong lye, when this solution is also poured into the vat and the whole is thoroughly stirred. The skins or hides are now deposited in the liquor and allowed to remain therein three days. They are then taken out and the hair scraped off, after which they are placed in a vat containing fresh water and left to remain there one day. They are then taken out, the flesh and lime still adhering is scraped off, and they are in proper condition for the bating process, which follows that of the liming process in the manufacture of leather.

It will be seen that my improved liming compound employs the following ingredients: water, lime, burnt oolite, and muriatic acid; but instead of the muriatic acid, acids of analogous character—such as hydrobromic, hydrofluoric, or hydriodic acids—may be employed by varying the proportion of acid in the solution according to its strength as compared with commercial muriatic or hydrochloric acid.

Having thus described my invention, I claim and desire to secure by Letters Patent of the United States—

The described compound or composition for liming hides or skins, composed of water, lime, burnt oolite, and muriatic acid, in or about the proportions set forth.

In testimony that I claim the foregoing as my own I have hereto affixed my signature in presence of two witnesses.

CHARLES J. TINNERHOLM.

Witnesses:
AUGUST PETERSON,
GEO. F. GRAHAM.